US009599989B1

(12) United States Patent
Brown

(10) Patent No.: US 9,599,989 B1
(45) Date of Patent: Mar. 21, 2017

(54) USE OF MOTION DATA IN THE PROCESSING OF AUTOMOTIVE RADAR IMAGE PROCESSING

(71) Applicant: Google Inc., Mountain View, CA (US)

(72) Inventor: Adam Brown, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/208,166

(22) Filed: Jul. 12, 2016

Related U.S. Application Data

(63) Continuation of application No. 13/626,673, filed on Sep. 25, 2012, now Pat. No. 9,423,498.

(51) Int. Cl.
*G01S 13/93* (2006.01)
*G01S 7/40* (2006.01)
*G08G 1/00* (2006.01)
*G05D 1/02* (2006.01)
*G01S 13/60* (2006.01)
*G01S 13/86* (2006.01)
*G08G 1/16* (2006.01)

(52) U.S. Cl.
CPC .............. *G05D 1/0257* (2013.01); *G01S 7/40* (2013.01); *G01S 13/60* (2013.01); *G01S 13/86* (2013.01); *G01S 13/931* (2013.01); *G01S 2013/9389* (2013.01); *G08G 1/00* (2013.01); *G08G 1/16* (2013.01)

(58) Field of Classification Search
CPC .......... G01S 5/021; G01S 7/40–7/4021; G01S 13/91–13/931; G08G 1/00; G08G 1/16; G08G 1/20; G01C 25/00
USPC ...................................... 342/70–72
See application file for complete search history.

(56) References Cited

U.S. PATENT DOCUMENTS

| 3,778,830 | A | * | 12/1973 | Joseph | ............ | G01S 7/40 342/146 |
| 4,891,611 | A | * | 1/1990 | Frerking | ............ | H03L 1/00 331/10 |
| 5,023,617 | A | * | 6/1991 | Deering | ............ | B60K 31/0075 342/70 |
| 5,247,306 | A | * | 9/1993 | Hardange | ............ | G01S 13/931 342/70 |
| 5,617,085 | A | * | 4/1997 | Tsutsumi | ............ | B60Q 9/008 180/167 |

(Continued)

*Primary Examiner* — Peter Bythrow
(74) *Attorney, Agent, or Firm* — Lerner, David, Littenberg, Krumholz & Mentlik, LLP

(57) ABSTRACT

In an example method, a vehicle configured to operate in an autonomous mode could have a radar system used to aid in vehicle guidance. The method could include a plurality of antennas configured to transmit and receive electromagnetic signals. The method may also include a one or more sensors configured to measure a movement of the vehicle. A portion of the method may be performed by a processor configured to: i) determine adjustments based on the movement of the vehicle; ii) calculate distance and direction information for received electromagnetic signals; and iii) recover distance and direction information for received electromagnetic signals with the adjustments applied. The processor may be further configured to adjust the movement of the autonomous vehicle based on the distance and direction information with adjustments applied.

20 Claims, 5 Drawing Sheets

(56) References Cited

U.S. PATENT DOCUMENTS

| | | | | |
|---|---|---|---|---|
| 5,623,270 | A * | 4/1997 | Kempkes | H01Q 1/005 342/174 |
| 5,710,565 | A | 1/1998 | Shirai et al. | |
| 5,760,884 | A * | 6/1998 | Yahashi | B60T 7/22 180/167 |
| 5,961,559 | A * | 10/1999 | Shimbara | B60L 7/006 180/168 |
| 5,986,601 | A * | 11/1999 | Sugimoto | G01S 7/415 342/109 |
| 6,179,080 | B1 * | 1/2001 | Kikuchi | G01S 7/484 180/169 |
| 6,202,027 | B1 * | 3/2001 | Alland | G01S 7/4004 340/435 |
| 6,230,107 | B1 * | 5/2001 | Yamamoto | G01P 3/66 342/104 |
| 6,233,516 | B1 * | 5/2001 | Egawa | B60K 31/0008 180/167 |
| 6,504,610 | B1 * | 1/2003 | Bauer | G01B 11/272 356/399 |
| 7,522,097 | B2 * | 4/2009 | Wakeman | G01S 7/4026 342/13 |
| 7,885,766 | B2 * | 2/2011 | Sugimoto | G08G 1/167 701/26 |
| 8,527,193 | B1 * | 9/2013 | Brennan | F42B 15/01 114/1 |
| 2003/0028291 | A1 * | 2/2003 | Matsuura | G01S 7/4802 701/1 |
| 2004/0150550 | A1 * | 8/2004 | Shouno | G01S 7/35 342/70 |
| 2007/0194982 | A1 * | 8/2007 | Stove | G01S 7/4017 342/174 |
| 2010/0066587 | A1 * | 3/2010 | Yamauchi | G05D 1/0044 342/70 |
| 2011/0050525 | A1 * | 3/2011 | Sanada | H01Q 1/3233 343/760 |
| 2013/0154870 | A1 * | 6/2013 | Mills | G01S 13/931 342/70 |
| 2013/0154871 | A1 * | 6/2013 | Gaboury | G01S 7/4026 342/82 |

* cited by examiner

USE OF MOTION DATA IN THE PROCESSING OF AUTOMOTIVE RADAR IMAGE PROCESSING

CROSS-REFERENCE TO RELATED APPLICATIONS

The present application is a continuation of U.S. patent application Ser. No. 13/626,673, filed Sep. 25, 2012, the disclosure of which is incorporated herein by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation. Additionally, some sensing features may be used in conjunction with a human-drive mode.

SUMMARY

In a first aspect, an vehicle apparatus is provided. In some embodiments, the vehicle may be an autonomous vehicle. However, in other embodiments the vehicle may be human controlled. In yet further embodiments, the vehicle may be controlled by a combination of human and autonomous control. The vehicle may include an antenna configured to function as a portion of a radar system. The antennas may function to both transmit and receive radio signals. Additionally, the vehicle is configured with at least one sensor configured to provide an output based on the motion of the vehicle. The radar system receives both the received radio signals and the output relating to the motion of the vehicle. The apparatus also includes a processor in the radar system configured to: i) calculate a movement parameter based on the motion of the vehicle; and ii) recover the distance and direction information from the received radio signal based on the movement parameter.

In a second aspect, a method is provided. The method includes receiving, from at least one antenna, radio signals providing distance and direction information for at least one object in an environment of the autonomous vehicle. The method also includes receiving, from at least one sensor, data relating to the motion of the vehicle. The method further includes a processor calculating a movement parameter based on the motion of the vehicle. The method yet further includes the processor recovering distance and direction information from the received radio signal based on the movement parameter. The distance and direction information may relate to a target within a field of view of the system.

In a third aspect, an article of manufacture including a tangible non-transitory computer-readable medium having stored instructions is provided. The instructions are executable by a computer system to cause the computer system to perform functions. The functions include receiving, from at least one antenna, radio signals providing distance and direction information for at least one object in an environment of the autonomous vehicle. The functions also include receiving, from at least one sensor, data relating to the motion of the vehicle. The functions further include a processor a movement parameter based on the motion of the vehicle. The functions yet further include the processor recovering distance and direction information from the received radio signal based on the movement parameter. The distance and direction information may relate to a target within a field of view of the system.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
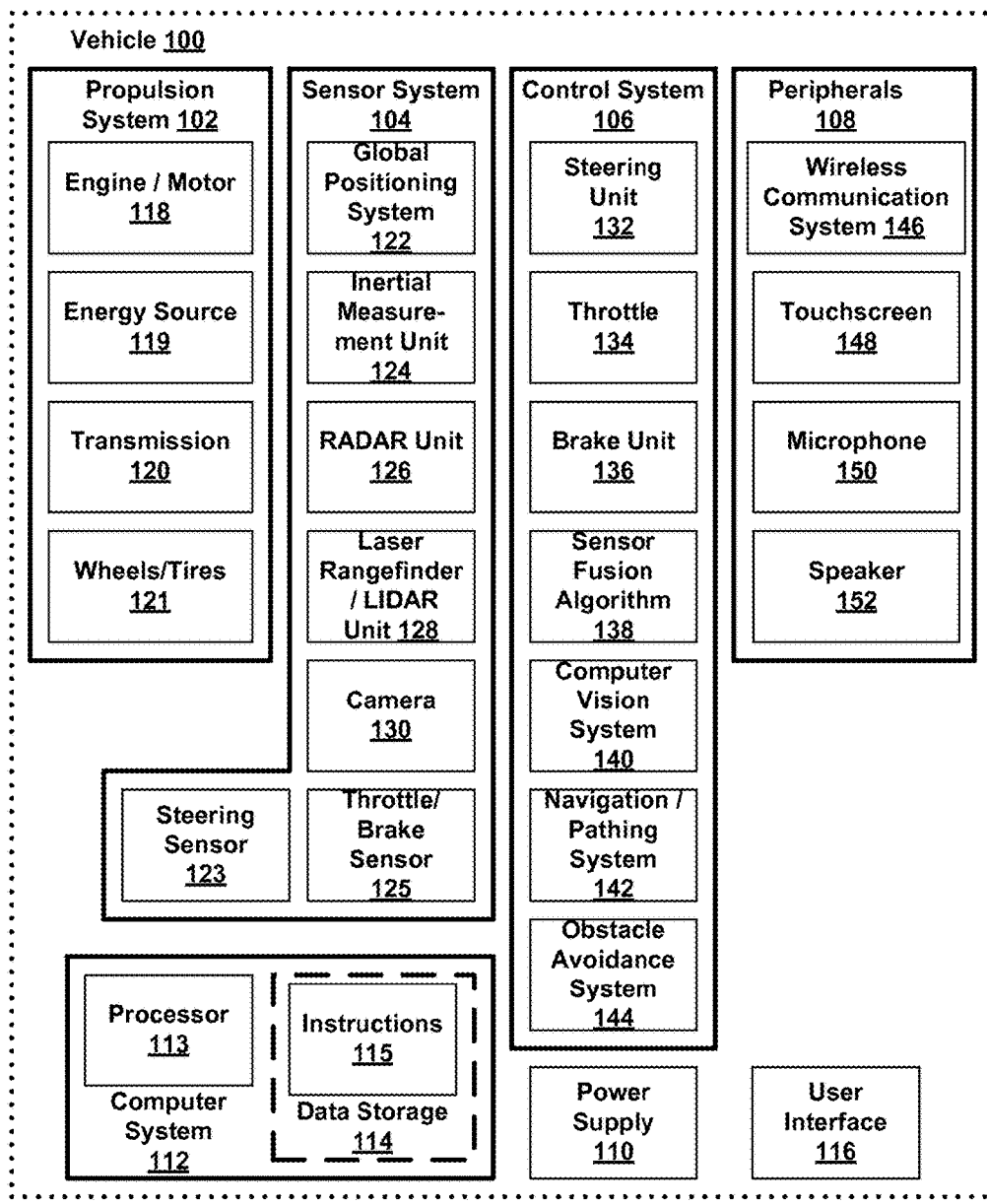
FIG. 1 is a functional block diagram illustrating a vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to radar systems in an autonomous vehicle. Some methods disclosed herein could be carried out in part or in full by a vehicle configured to operate in an autonomous mode with or without external interaction (e.g., such as from a user of the vehicle). Further, the embodiments disclosed herein may also be used to help optimize the radar system based on the movement of the autonomous vehicle.

The radar system of the autonomous vehicle may feature a plurality of antennas. Each antenna may be configured to (i) transmit electromagnetic signals, (ii) receive electromagnetic signals, or (iii) both transmit and receive electromagnetic signals. The antennas may form an array of antenna elements. The array may be able to steer a beam formed by the transmitted electromagnetic signals. Additionally, the array may aid in detecting the direction from which electromagnetic signals are received.

The radar system further contains a processor configured to process the received signals. The received signals may be reflected from objects within the field of view of the radar system. The reflected signals may be stored as data for processing by the radar system. The processor may be configured to located objects within the field of view of the radar system. For example, the processor in the radar system may calculate a distance and a direction to one or more objects within the field of view of the radar system.

Additionally, the autonomous vehicle may have one or more output-indication sensors configured to measure a movement of the vehicle. Such output-indication sensors could include, for example, sensors that monitor the wheel speed of the vehicle, the steering position, and/or the current location of the vehicle (e.g., a Global Positioning System).

Within the context of the disclosure, the processor in the radar system may use data associated with the output-indication sensors to adjust the determination of the distance and the direction to each object within the field of view of the radar system. Depending on the embodiment, the processor may compensate for an acceleration of the vehicle. In particular, a sudden acceleration or deceleration may cause the pitch of the autonomous vehicle to vary. This quick change in pitch may introduce errors into radar system through a distortion in the received signals. Additionally, if the vehicle is turning, the vehicle may have an associated pitch and yaw from turning. This quick change in pitch and yaw may also introduce errors into radar system through a distortion in the received signals. Further, errors may be introduced into radar system through a distortion in the received signals caused by a speed of the vehicle. For example, when traveling at 25 miles per hour, the vehicle may have a vibration that introduces errors.

Additionally, the vehicle could be operated in a safety mode. The safety mode could represent an autonomous, semi-autonomous, or manual mode in which the vehicle may be controlled to operate in a safe fashion. Such safety modes of operation could include the vehicle autonomously pulling over to the side of a road and/or the vehicle returning some or all operational control of the vehicle to a driver or another control system.

A server, such as one or more nodes of a server network, could additionally or alternatively carry out the methods disclosed herein in part or in full. In an example embodiment, a server or computer may receive both (i) data associated with the output-indication sensors and (ii) data related to the received signals. Such data associated with the output-indication sensors could include any current parameters of the vehicle (e.g., velocity, acceleration, steering position). Further, the server may already know (or be able to calculate) information related to the current parameters. Further, the server may also receive (or already have stored) the data related to the received signals.

The server may be able to calculate a radar adjustment value for the operation of the radar based on the data associated with the output-indication sensors and the data related to the received signals. The server may the use the calculated radar adjustment in further calculations. These further calculations may include, but are not limited to, calculation of revised the distance and direction information from the based on data associated with the output-indication sensors.

Also disclosed herein are non-transitory computer readable media with stored instructions. The instructions could be executable by a computing device to cause the computing device to perform functions similar to those described in the aforementioned methods.

It is understood that there are many different specific methods and systems that could be used in an unambiguous angle calculation for the radar system. These specific methods and systems are contemplated herein, and several example embodiments are described below.

2. Example Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. For example, a computer system could control the vehicle 100 while in the autonomous mode, and may be operable to transmit a radio signal, receive reflected radio signals with at least one antenna in the radar system, process the received reflected radio signals, locate the objects that caused the reflections, calculate an angle and a distance to each object that reflected the radio signal, and calculate an unambiguous angle associated with the angle. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, ultrasonic sensors (not shown), an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., 02 monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, with respect to the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/ pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

Figure 4:
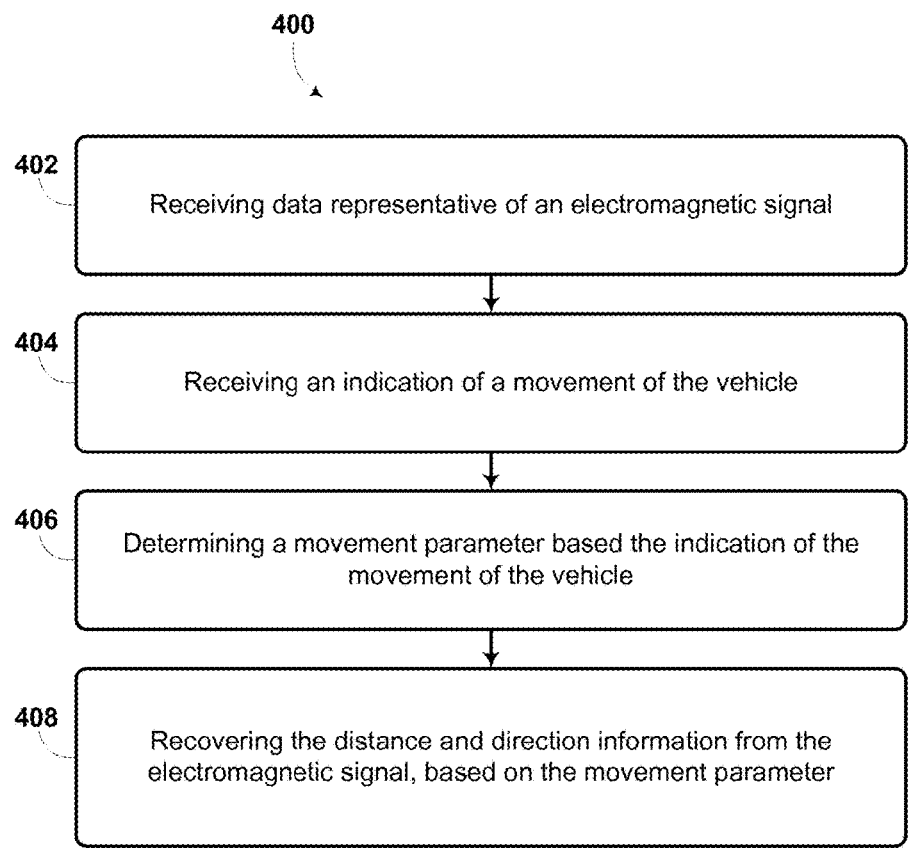
FIG. 4 shows a method, according to an example embodiment.

In some embodiments, data storage 114 may contain instructions 115 (e.g., program logic) executable by the processor 113 to execute various functions of vehicle 100, including those described herein in connection with FIG. 4. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (and the computer system 112 could interact to provide an indication of an input provided to control a vehicle or an indication of the surroundings of a vehicle.

The computer system 112 could carry out several determinations based on the indications received from the output-indication sensors and the data related to the received signals. For example, the computer system 112 could calculate a radar adjustment based on the motion of the vehicle. Additionally, the computer system 112 could calculate revised distance and direction information from the received electromagnetic signal based on the radar adjustment values.

In one scenario, the radar unit 126 may receive a plurality of radar signals from a plurality of target objects within the field of view of the radar. Additionally, the radar unit 126 may transmit data relating to the plurality of received radar signals to the computer system 112. Further, the computer system 112 may also receive data relating to the motion of the autonomous vehicle. For example, the computer system 112 may receive an indication that vehicle is decelerating at a specific rate. Thus, the computer system 112 may calculate a radar adjustment based on the deceleration.

For example, if the vehicle is quickly decelerating, the front of the vehicle may pitch downward toward the street. The computer system 112 may calculate a radar adjustment to compensate for the change in vehicle pitch. In this some embodiments, the radar adjustment may include ignoring the radar signals for a period of time. In another embodiment, the radar adjustment may include a weighting criteria applied to the radar signals. The weighting criteria may take many forms. In some embodiments, the weighting criteria may make the radar signals received during the deceleration have less importance in calculations by the computer system 112. In other embodiments, the weighting criteria may adjust the data received based on the radar signals in order to compensate for a change in pitch of the radar antennas (i.e. mathematically calculate an approximation for the data received if the vehicle had not had a change in pitch).

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
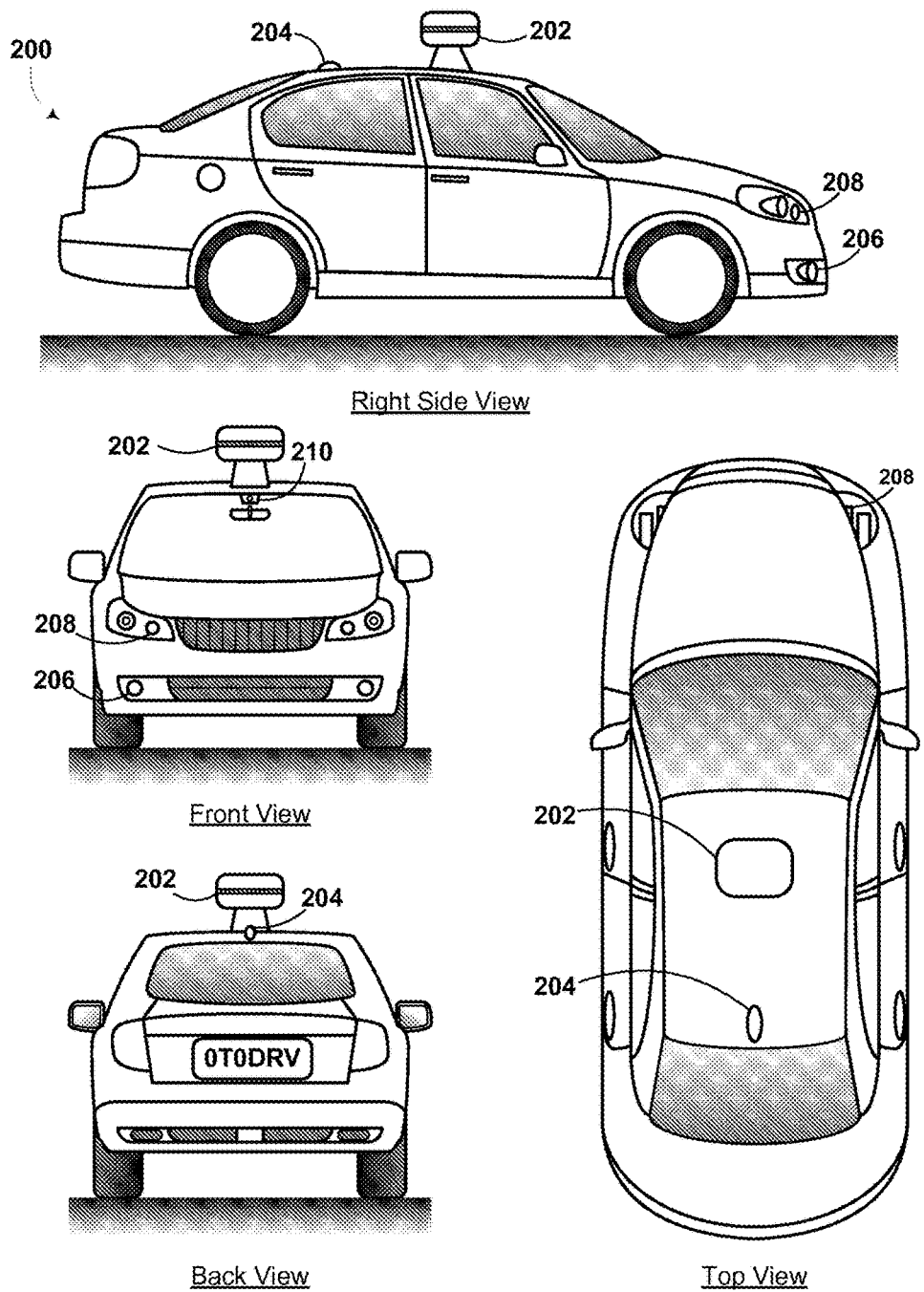
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radar 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radar 206 and laser rangefinder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3:
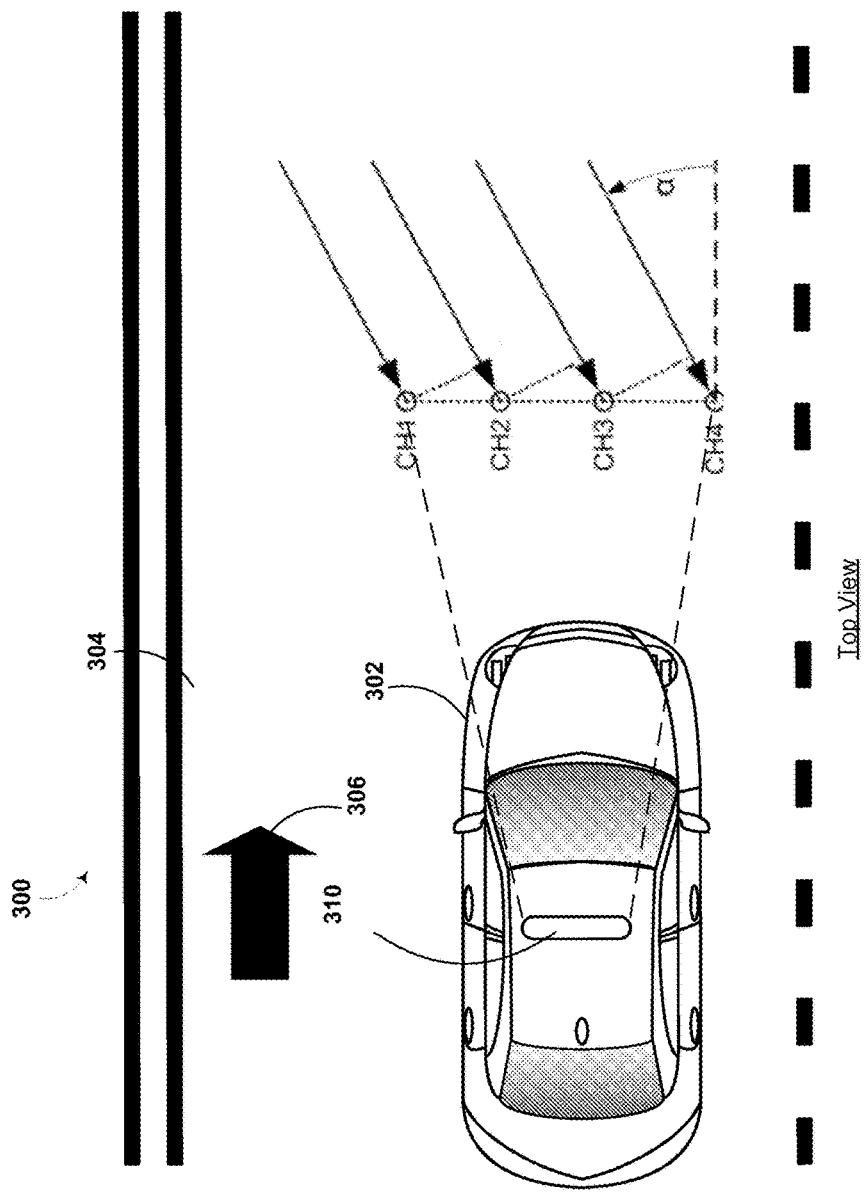
FIG. 3 is a top view of an autonomous vehicle operating scenario, according to an example embodiment.

FIG. 3 illustrates a scenario 300 involving a vehicle 302 traveling down a roadway 304. A vehicle 302 could be operating in an autonomous mode. Further, the vehicle 302 may be configured with a radar unit 310. The radar unit 310 may be configured with a plurality of antenna elements. In the particular embodiment shown in FIG. 3, the radar unit 310 includes an array of four antennas. A schematic view of antennas CH1, CH2, CH3, and CH4 is shown to the right of vehicle 302 in FIG. 3. As shown, the antennas are spaced apart with an equal distance between each adjacent antenna. However, the system and methods disclose herein may also be used with radar systems with non-equal antenna spacing. Further, the radar unit 310 may contain a processor that receives the signals from each antenna and coverts the plurality of signals into data.

In the example shown, the antenna array transmits a radio signal and receives a portion of the transmitted radio signal that has reflected from an object in the environment of vehicle 302. The reflected signal is received at an angle $\alpha$ to the antenna array. The angle $\alpha$ may be assumed to be the same for each element of the antenna array due to the relatively narrow antenna spacing compared to the distance to the reflection target(s).

In one example of FIG. 3, the vehicle may be traveling in the direction indicated by the arrow 306. As the vehicle is traveling, sensors (as described with respect to FIGS. 1 and 2) may provide information about the vehicle's movement to a processor in the vehicle. In one embodiment, as the vehicle moves forwards, the signals reflected back to the vehicle, may seem to have a relative motion to them despite the objects causing the signals to reflect being stationary. For example, the angle $\alpha$ may appear to be increasing as the vehicle moves forward. The radar unit 310 may contain a processor that converts the received signals into data representative of the received signals.

The processor may receive both data based on the received signals and data from the sensors indicating the vehicle is in motion. The processor in the autonomous vehicle determines the distance and the angle to objects that are reflecting the received signals back to the radar system. Further, the processor may also determine an object velocity of the objects that are reflecting the received signals back to the radar system. Additionally, the processor determines a radar adjustment based on the movement of the vehicle. In this instance, the processor may determine that the motion of the vehicle, not the movement of the objects causing the reflection, causes the apparent change in angle of the reflections. Thus, the processor may adjust the data based on the received signals to indicate the objects causing the reflections are stationary. Additionally, the movement of the vehicle may also cause an apparent change in the object velocity of the objects that are reflecting the received signals back to the radar system. The radar system may also correct for the apparent change in velocity.

In some example embodiments, the radar system may operate with an associated signal processing mode. The data may be adjusted based on a mode of operation as well. In one embodiment, the radar system may use an adaptive algorithm selection mode. In this mode, the radar system may adjust various parameters of the radar system during operation. The radar may change parameters such as beam widths, phasing of radar elements, etc. to produce a desired result. While operating in the adaptive algorithm selection mode, the radar system may use movement data to further adjust parameters of the radar system. For example, the radar system may change how the radar collects incoming signals mode to minimize impacts of motion data related sidelobes. Additionally, the radar system may adjust heterodyne mixing plan to attempt to improve rejection of motion data errors in intermediate frequency (IF) processing. Further, the radar system may use adaptive beam steering based on vehicle yaw and pitch.

In another example embodiment, the radar system may operate in an object detection mode. While operating in the object detection mode, the radar system may use movement data to further adjust parameters of the radar system. The radar system may apply a correction factor added to a Polar to Cartesian mapping function for to correct the detected object location and velocity. Additionally, the radar system may use platform vibration data to predict spur locations, and limit their affect on object detection.

In yet another example embodiment, the radar system may operate in a direction of arrival estimation mode. While operating in the direction of arrival estimation mode, the radar system may use movement data to further adjust parameters of the radar system. For example, the radar system may modify the inverse relationship between the vehicle's acceleration and a detection/non-detection weight applied by the radar system. In a still further embodiment, the radar system may operate in a target tracking mode. In target tracking mode, the radar system may modify the inverse relationship between the vehicle's acceleration and a detection/non-detection weight applied by the radar system. The associated signal processing modes and how each may be modified based on the movement data are given as examples. Other modes may be used, and modified, based on the methods disclosed herein.

In another example of FIG. 3, the vehicle may be traveling in the direction indicated by the arrow 306. As the vehicle is traveling, the vehicle may decrease in speed. As the vehicle decreases in speed, the front (or nose) of the vehicle may tilt (or pitch) down toward the ground. As the vehicle pitches forwards, the signals reflected back to the vehicle, may seem to have moved vertically upward (i.e. increase in altitude above the horizon) despite the objects causing the signals to reflect being stationary. For example, signals that were reflected along the horizon line before the vehicle pitched forward may appear to be coming from a higher altitude than the horizon.

Similar to the first embodiment, the processor will receive both data based on the received signals and data from the sensors indicating the vehicle is in motion. The processor in the autonomous vehicle determines the distance and the angle to objects that are reflecting the received signals back to the radar system. Further, the processor may also determine an object velocity of the objects that are reflecting the received signals back to the radar system. Additionally, the processor determines a radar adjustment based on the movement of the vehicle. In this instance, the processor may determine that the motion of the vehicle, not the movement of the objects causing the reflection, causes the apparent change in vertical of the reflections. Thus, the processor may adjust the data based on the received signals to indicate that the objects causing the reflections are stationary.

However, in some additional embodiments, the pitch (or other movement) of the vehicle may occur to such an extent that the reflected signals are no longer received by the antennas at all. For example, a radar system may have a beam width in a specific direction of only 5 degrees. If the vehicle's pitch is greater than 5 degrees, objects may appear to be outside the beam width. Thus, these objects may not reflect signals back to the vehicle. In this embodiment, the processor may adjust the data by temporarily ignoring the lack of reflections received by the antenna. The processor may mathematically predict where the reflections would be if they were within the antenna beam width. Further, the processor may use the mathematical predictions for the reflections during the period where the vehicle's pitch is greater than a threshold associated with the radar beam width. Typically, the acceleration or deceleration of a vehicle is only temporary. Thus, the mathematical predictions could be discontinued after the temporary acceleration or deceleration.

In yet another embodiment, the pitch (or other movement) of the vehicle may be to an extent that the reflected signals are received with relatively low power. For example, as the reflected signals move near the edge of the radar system beam width, the radar system may be less efficient at receiving signals. In one example, as the vehicle's pitch approaches 5 degrees, the reflections may appear much weaker. Thus, a typical radar system may incorrectly assume the objects causing the reflections are further away. In this embodiment, the processor may adjust the data by temporarily increasing a weighting on reflections received by the antenna. The processor may mathematically increase a weighting factor as if the reflections were within the optimal portion of the antenna beam width. Further, the processor may use the mathematical weighting factor for the reflections during the period where the vehicle's pitch is within a range of the threshold associated with the radar beam width. Typically, the acceleration or deceleration of a vehicle is only temporary. Thus, the use of the weighting factor could be discontinued after the temporary acceleration or deceleration.

In a further embodiment, the speed vehicle may cause artifacts in the received signals. For example, at a specific velocity, the vehicle may experience a vibration. This vibration may manifest as a disturbance in the received signals. For example, the vibration may cause a periodic variance in the received signal. In this embodiment, the processor may adjust the data by temporarily adjusting a weighting on reflections received by the antenna. The processor may mathematically adjust the weighting factor to mitigate the variations caused by the vehicle traveling at a specific speed (and the associated vibrations in this example). In some embodiments, the received signals may be filtered with a filter to remove the disturbances. Further, the processor may use the mathematical weighting factor for the reflections during the period where the velocity of the vehicle causes disturbances. Typically, disturbances in the received signals

3. Example Methods

A method 400 is provided for receiving data representative of an electromagnetic signal, receiving an indication of a movement of the vehicle, determining a movement parameter based the indication of the movement of the vehicle, and recovering the distance and direction information from the electromagnetic signal, based on the movement parameter. The method could be performed using any of the apparatus shown in FIGS. 1-3 and described above; however, other configurations could be used. FIG. 4 illustrates the steps in an example method, however, it is understood that in other embodiments, the steps may appear in different order and steps could be added, subtracted, or modified. Additionally, the steps may be performed in a linear manner (as shown) or may be performed in a parallel manner (not shown).

Step 402 includes receiving data representative of an electromagnetic signal. The vehicle is configured with a radar system. The vehicle described in this method could be the vehicle 100 and/or vehicle 200 as illustrated and described in reference to FIGS. 1 and 2, respectively. Receiving data representative of an electromagnetic signal could include receiving radio signals that are reflected from one or more objects in the field of view of the radar system. A processor in the radar system may convert the received radio signals into data to relay for further processing. For example, the radar system may transmit a signal and receive a set of reflected signals back. The radar system may further identify distance and direction information to each object that causes reflections back to the vehicle. Depending upon the embodiment, the reflected signals may be processed fully or in part by a server and communicated to the vehicle.

Step 404 includes receiving an indication of a movement of the vehicle. One or more output-indication sensors could measure the movement of the vehicle. The vehicle may speed up, slow down, turn, change course, or keep the same movement as part of the output. Additionally, the vehicle movement may cause a responsive change in orientation of the vehicle. For example, the vehicle speeding up, slowing down, or turning may also cause a responsive change in the pitch or yaw of the vehicle. Additionally, the indication of a movement of the vehicle may be the speed, acceleration, heading, or any other indicator of the motion (or lack thereof) of the vehicle. The indication of a movement of the vehicle could be received from at least one output-indication sensor. Additionally, the vehicle may be stopped, thus the output may indicative of the vehicle having no motion. Other types of indication of an output of the vehicle are possible.

Step 406 includes determining a movement parameter based the indication of the movement of the vehicle. The movement parameter could correspond to an adjustment of the data received in step 402 that accounts for the movement of the vehicle. Possible movement parameters could include adjustments based on any combination of a speed, a rate of change of speed (acceleration), a heading, or any other indicator of the motion (or lack thereof) of the vehicle associated with driving on or off a roadway. For example, a vehicle may be traveling at 15 miles per hour and slow down to stop at a stop sign. As the vehicle decreases in speed, the front (or nose) of the vehicle may tilt (or pitch) down toward the ground. As the vehicle pitches forwards, the signals reflected back to the vehicle, appear to have moved vertically upward (i.e. increase in altitude above the horizon) despite the objects causing the signals to reflect being stationary. Thus, the movement parameter may be an adjustment to the data representative of an electromagnetic signal to make the reflections appear as if they have not moved relative to the radar. In some embodiments, the movement parameter may be called a radar adjustment.

In other embodiments, the vehicle may turn to the left or right. Due to the turning motion of the vehicle, the signals reflected back to the vehicle, appear to have responsively moved to the right or to the left. The movement parameter may be an adjustment to the data representative of an electromagnetic signal to make the reflections appear as if they have not moved relative to the radar. In yet another embodiment, the movement of the vehicle may cause the vehicle to experience a vibration. This vibration may manifest as a disturbance in the received signals. For example, the vibration may cause a periodic variance in the received signal. The movement parameter may be an adjustment to the data representative of an electromagnetic signal to remove the period variance cause by the vibration.

Step 408 includes recovering the distance and direction information from the electromagnetic signal, based on the movement parameter. The computer system of the vehicle could alter the received data representative of an electromagnetic signal based on the determined movement parameter. In some embodiments, recovering the distance and direction information from the electromagnetic signal based on the movement parameter calculates what the distance and direction information from the radar system would be if the vehicle was not moving. In another embodiments, recovering the distance and direction information from the electromagnetic signal based on the movement parameter calculates what the distance and direction information from the radar system would be if the vehicle did not change its movement.

A processor within the vehicle may recover the distance and data information. In some embodiments, there is a mathematical relation between the determined movement parameter and the distance and data information. For example, the distance and data information may be retrieved by applying a weighting determined at step 406 to the data provided at step 402. Other methods may be used to retrieve the distance and data information based on the specific embodiment. For example, the movement parameter determined at step 406 and the data provided at step 402 may take different formats depending on the specific embodiment. However, the methods and systems presented herein are not dependent on the format of the various signals.

Example methods, such as method 400 of FIG. 4, may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

It will be understood that there are other similar methods that could describe receiving data representative of an electromagnetic signal, receiving an indication of a movement of the vehicle, determining a movement parameter based the indication of the movement of the vehicle, and recovering the distance and direction information from the electromagnetic signal, based on the movement parameter.

Those similar methods are implicitly contemplated herein.

Figure 5:
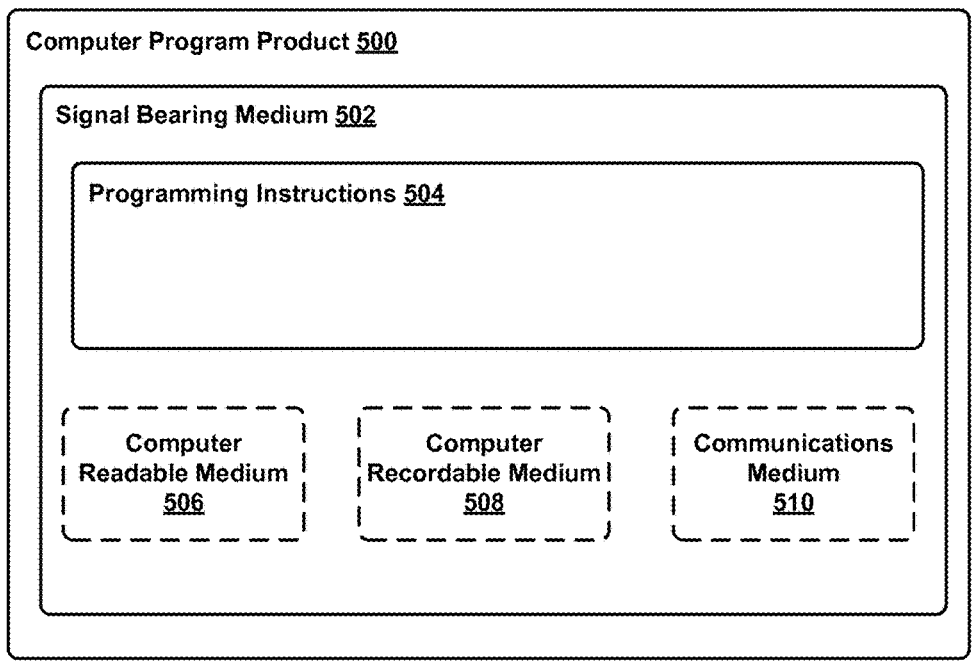
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

The invention claimed is:

1. A method of controlling a vehicle, the method comprising:
receiving, from a radar unit of the vehicle, first radar data corresponding to distance and direction information for the movement of an object in an environment of the vehicle;
using the distance and direction information to determine a velocity for the object indicating that the object is moving relative to the vehicle;
receiving movement data representative a movement of the vehicle in a first direction;
determining, by a computer system having at least one processor, a movement parameter including an adjustment value to compensate for the movement based on the movement data; and
determining, by the computer system, adjusted distance and direction information for the first object based on the movement parameter and the velocity;
determine that the movement parameter meets a threshold value associated with a width of a radar beam;
after receiving the first radar data, receiving, from the radar unit, second radar data;
determining that the second radar data does not provide distance or direction information for the object;
controlling, by the computer system, the vehicle in an autonomous driving mode using the adjusted distance and direction information; and
when the movement parameter is determined to meet the threshold value, temporarily ignoring, by the computing system, the determination that the second radar data does not provide distance and direction information for the object when controlling the vehicle.

2. They method of claim 1, wherein the width of the radar beam is defined in a direction corresponding to the first direction.

3. They method of claim 1, wherein first direction is towards a ground surface below the vehicle.

4. The method of claim 1, further comprising, when temporarily ignoring the determination that the second radar data does not provide distance and direction information for the object, estimating updated distance and direction information for the object using the adjusted distance and direction information for the object.

5. The method of claim 4, wherein the updated distance and direction information for the object corresponds to a location of the object within the width of the radar beam.

6. The method of claim 1, wherein the movement corresponds to a temporary acceleration of the vehicle.

7. The method of claim 1, wherein the movement corresponds to a temporary deceleration of the vehicle.

8. The method of claim 1, wherein the adjusted distance and direction information indicates that the object is stationary.

9. A system for controlling a vehicle, the system comprising:
one or more processors configured to:
receive, from a radar unit of the vehicle, first radar data corresponding to distance and direction information for the movement of an object in an environment of the vehicle;
use the distance and direction information to determine a velocity for the object indicating that the object is moving relative to the vehicle;
receive movement data representative a movement of the vehicle in a first direction;
determine a movement parameter including an adjustment value to compensate for the movement based on the movement data; and
determine adjusted distance and direction information for the first object based on the movement parameter and the velocity;
determine that the movement parameter meets a threshold value associated with a width of a radar beam;
after receiving the first radar data, receiving, from the radar unit, second radar data;

determine that the second radar data does not provide distance or direction information for the object;

control the vehicle in an autonomous driving mode using the adjusted distance and direction information; and when the movement parameter is determined to meet the threshold value, temporarily ignoring, the determination that the second radar data does not provide distance and direction information for the object when controlling the vehicle.

10. They system of claim 9, wherein the width of the radar beam is defined in a direction corresponding to the first direction.

11. They system of claim 9, wherein first direction is towards a ground surface below the vehicle.

12. The system of claim 9, wherein the one or more processors are further configured to, when temporarily ignoring the determination that the second radar data does not provide distance and direction information for the object, estimate updated distance and direction information for the object using the adjusted distance and direction information for the object.

13. The system of claim 12, wherein the updated distance and direction information for the object corresponds to a location of the object within the width of the radar beam.

14. The system of claim 9, wherein the movement corresponds to a temporary acceleration of the vehicle.

15. The system of claim 9, wherein the movement corresponds to a temporary deceleration of the vehicle.

16. The system of claim 9, wherein the adjusted distance and direction information indicates that the object is stationary.

17. The system of claim 9, further comprising the vehicle.

18. The system of claim 9, further comprising the radar unit.

19. A non-transitory computer readable storage medium on which instructions are stored, the instructions, when executed by one or more processors, cause the one or more processors to perform a method of controlling a vehicle, the method comprising:

receiving, from a radar unit of the vehicle, first radar data corresponding to distance and direction information for the movement of an object in an environment of the vehicle;

using the distance and direction information to determine a velocity for the object indicating that the object is moving relative to the vehicle;

receiving movement data representative a movement of the vehicle in a first direction;

determining a movement parameter including an adjustment value to compensate for the movement based on the movement data; and determining adjusted distance and direction information for the first object based on the movement parameter and the velocity;

determine that the movement parameter meets a threshold value associated with a width of a radar beam;

after receiving the first radar data, receiving, from the radar unit, second radar data;

determining that the second radar data does not provide distance or direction information for the object;

controlling the vehicle in an autonomous driving mode using the adjusted distance and direction information; and when the movement parameter is determined to meet the threshold value, temporarily ignoring the determination that the second radar data does not provide distance and direction information for the object when controlling the vehicle.

20. They medium of claim 19, wherein first direction is towards a ground surface below the vehicle.

* * * * *